(12) United States Patent
Honda et al.

(10) Patent No.: US 8,174,595 B2
(45) Date of Patent: May 8, 2012

(54) DRIVE UNIT FOR IMAGE SENSOR, AND DRIVE METHOD FOR IMAGING DEVICE

(75) Inventors: Tsutomu Honda, Hachioji (JP); Kazuhiro Haneda, Akiruno (JP); Satoshi Tanaka, Tokorozawa (JP)

(73) Assignee: Olympus Imaging Corp. (JP)

( * ) Notice: Subject to any disclaimer, the term of this patent is extended or adjusted under 35 U.S.C. 154(b) by 750 days.

(21) Appl. No.: 12/328,823

(22) Filed: Dec. 5, 2008

(65) Prior Publication Data

US 2009/0195683 A1 Aug. 6, 2009

(30) Foreign Application Priority Data

Dec. 26, 2007 (JP) ................................ 2007-333432

(51) Int. Cl.
*H04N 3/14* (2006.01)
(52) U.S. Cl. ....................................... 348/294; 348/308
(58) Field of Classification Search .................. 348/272, 348/273, 280, 281, 222.1, 294, 302–308
See application file for complete search history.

(56) References Cited

U.S. PATENT DOCUMENTS

| | | | | |
|---|---|---|---|---|
| 6,593,967 B1 * | 7/2003 | McGarvey et al. | ........... | 348/312 |
| 7,728,895 B2 * | 6/2010 | Tanaka et al. | ............... | 348/302 |
| 2006/0119715 A1 * | 6/2006 | Nam | ............................. | 348/272 |
| 2008/0273105 A1 | 11/2008 | Tanaka et al. | | |

FOREIGN PATENT DOCUMENTS

| | | |
|---|---|---|
| JP | 2005-244995 | 9/2005 |
| JP | 2007-150448 | 6/2007 |
| JP | 2007-174600 A | 7/2007 |

OTHER PUBLICATIONS

Chinese Office Action dated Apr. 13, 2010 in corresponding Chinese Patent Application No. 200810185053.X (with English language translation).

* cited by examiner

*Primary Examiner* — Mohammed Hasan
(74) *Attorney, Agent, or Firm* — Ostrolenk Faber LLP

(57) ABSTRACT

A drive unit for an image sensor of the present invention comprises, for horizontal scanning, a drive section performing addition and readout of a first FD (floating diffusion) shared by two pixels of the same color that are adjacent in a diagonal direction by simultaneously transferring electrical charge of the two pixels of the same color, and for a second FD shared by two pixels of different colors that are adjacent in a diagonal direction, transferring and reading out electrical charge of a pixel of one color among the two pixels of different colors.

7 Claims, 11 Drawing Sheets

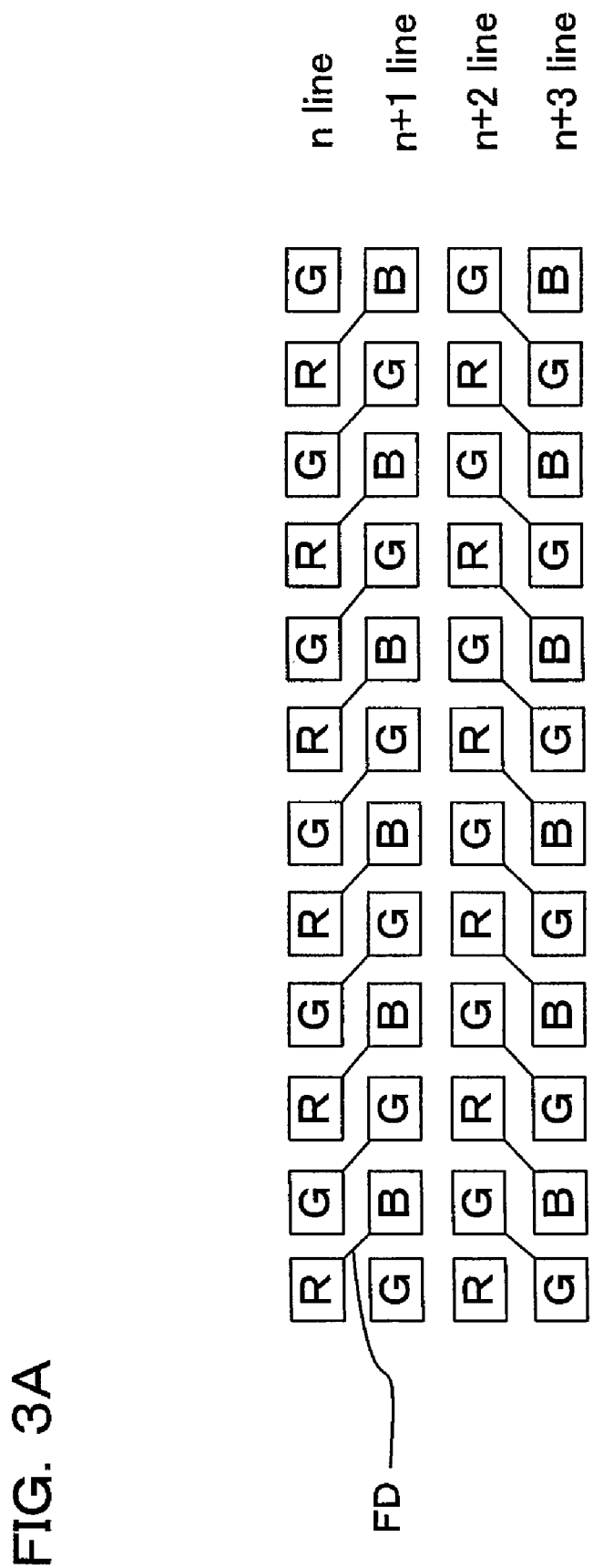

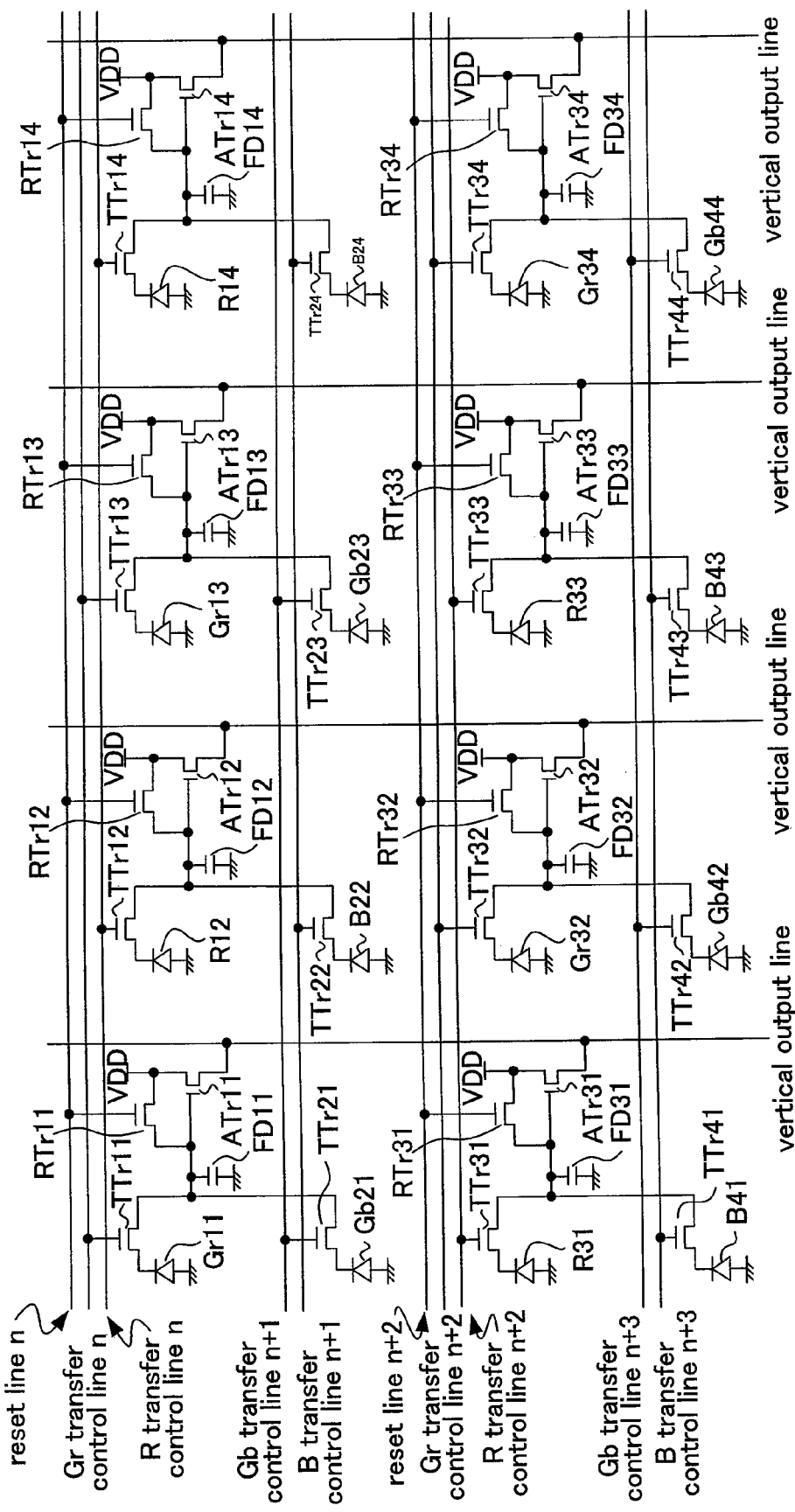

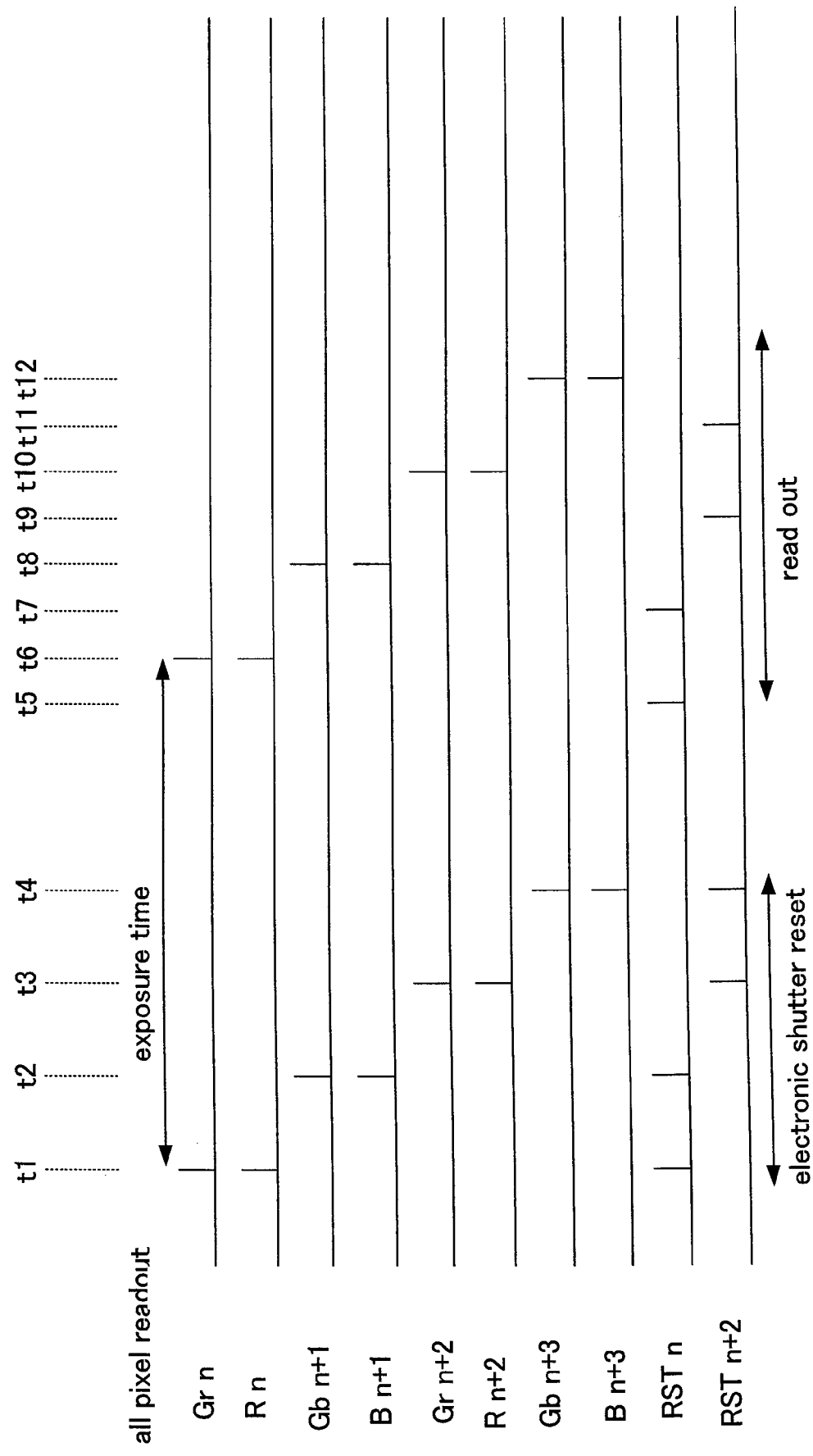

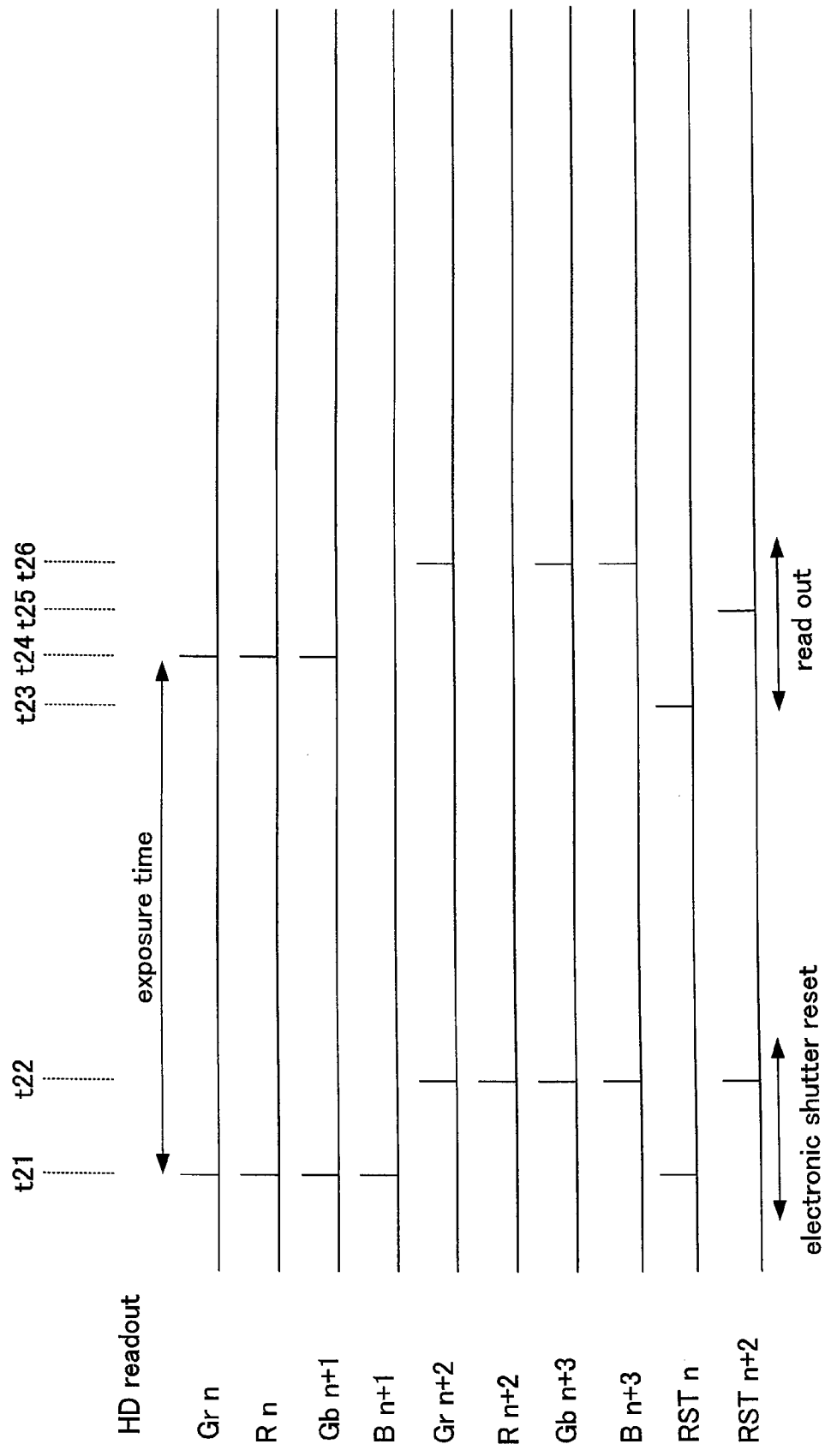

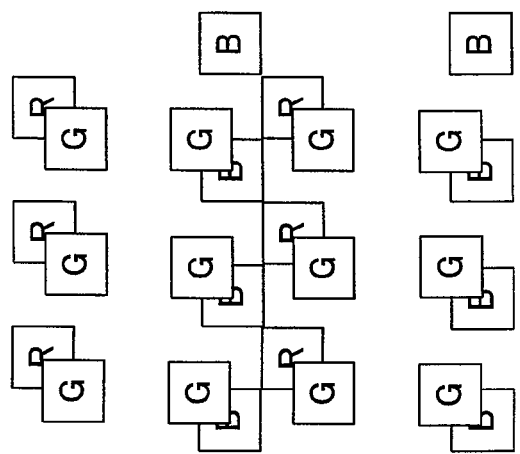
FIG. 6D
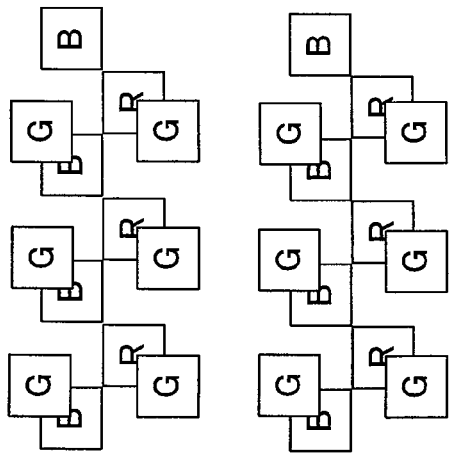
FIG. 6C
FIG. 6B

FIG. 7A

| | | | | | | |
|---|---|---|---|---|---|---|
|101a|Gr|R|Gr|R|Gr|R|
|102a|B|Gb|B|Gb|B|Gb|
|101b|Gr|R|Gr|R|Gr|R|
|102b|B|Gb|B|Gb|B|Gb|
| |Gr|R|Gr|R|Gr|R|
| |B|Gb|B|Gb|B|Gb|
| |Gr|R|Gr|R|Gr|R|
| |B|Gb|B|Gb|B|Gb|

FIG. 7B

| | | | | | | |
|---|---|---|---|---|---|---|
|101|G|R|G|R|G|R|
|102|B|G|B|G|B|G|

| | | | | | |
|---|---|---|---|---|---|
|G|R|G|R|G|R|
|B|G|B|G|B|G|

DRIVE UNIT FOR IMAGE SENSOR, AND DRIVE METHOD FOR IMAGING DEVICE

Benefit is claimed, under 35 U.S.C. §119, to the filing date of prior Japanese Patent Application No. 2007-333432 filed on Dec. 26, 2007. This application is expressly incorporated herein by reference. The scope of the present invention is not limited to any requirements of the specific embodiments described in the application.

BACKGROUND OF THE INVENTION

1. Field of the Invention

The present invention relates to a drive unit for an image sensor, a drive method for an image sensor, an imaging device and an image sensor, and in detail relates to a drive unit for an image sensor for an X-Y scanning type image sensor having an RGB Bayer array type color filter, a drive method for an image sensor, an imaging device, and an image sensor.

2. Description of the Related Art

In recent years digital cameras that are compatible with the recording of high speed moving images, such as HD (High Definition) movies, have been proposed. Also, digital single lens reflex cameras are increasingly using CMOS (Complementary Metal Oxide Semiconductor) sensors in order to enable rapid shooting and live view display. With this type of digital single lens reflex camera, a number of pixels is 10-12 M, which is significantly more than the 2M pixels required for HD movies. A CMOS sensor therefore provides output after carrying out thinning of a pixel signal, or a summation operation.

An imaging device in which pixels constituting a color filter of the same color are connected to a single output circuit is disclosed, for example, in Japanese unexamined patent application No. 2005-244995, laid-open Sep. 8, 2005. As shown in FIG. 7A and FIG. 7B, this imaging device adds signals corresponding to G (green) pixels 101a and 101b, and outputs as a signal for a G pixel 101, and adds signals corresponding to B (blue) pixels 102a and 102b to output as a B pixel 102. Specifically, signals of two pixels in a vertical direction are respectively added and output.

SUMMARY OF THE INVENTION

An object of the present invention is to provide a drive unit for an image sensor that is capable of performing pixel addition and output with a simple structure, in order to carry out high speed readout applicable to HD movies etc., a drive method for the image sensor, an imaging device, and an image sensor.

A drive unit of the present invention, for an X-Y scanning type image sensor having an RGB Bayer array color filter, comprises, for horizontal scanning, a drive section performing addition and readout of a first FD (floating diffusion) shared by two pixels of the same color that are adjacent in a diagonal direction by simultaneously transferring electrical charge of the two pixels of the same color, and for a second FD shared by two pixels of different colors that are adjacent in a diagonal direction, transferring and reading out electrical charge of a pixel of one color among the two pixels of different colors.

A drive method of the present invention, for an X-Y scanning type image sensor having an RGB Bayer array color filter, comprises, in horizontal scanning, performing addition and readout of a first FD (floating diffusion) shared by two pixels of the same color that are adjacent in a diagonal direction by simultaneously transferring electrical charge of the two pixels of the same color, and for a second FD shared by two pixels of different colors that are adjacent in a diagonal direction, transferring and reading out electrical charge of a pixel of one color among the two pixels of different colors.

An imaging device of the present invention, that uses an X-Y scanning type image sensor having an RGB Bayer array type color filter, comprises: an image sensor having an FD (Floating Diffusion) shared by two pixels that are adjacent in a diagonal direction, a control section for controlling readout for each different color in a horizontal scanning direction of the image sensor, an image processing section for processing signals that have been readout by the control section, and a storage section for storing image data that has been processed by the image processing section.

An X-Y scanning type image sensor of the present invention, having an RGB Bayer array type color filter, comprises: a first FD (Floating Diffusion) common to two G pixels, the two G pixels being adjacent to each other in a diagonal direction and being connected the first FD by means of a first transfer transistor and a second transfer transistor, respectively, a first reset transistor connected to the first FD, a first amplification transistor connected to the first FD, a second FD, common to two pixels of R and B, that are adjacent to each other in a diagonal direction, and are connected to the second FD by means of a third transfer transistor and a fourth transfer transistor, respectively, a second reset transistor connected to the second FD, a second amplification transistor connected to the second FD, and a signal reading section connected to the first amplification transistor and the second amplification transistor, and wherein the first transfer transistor, the second transfer transistor, the third transfer transistor and the fourth transfer transistor are respectively independently connected to transfer control lines for carrying out transfer control.

BRIEF DESCRIPTION OF THE DRAWINGS

FIG. 3A and FIG. 3B are drawings showing pixels of an image sensor of a digital single lens reflex camera of the first embodiment of the present invention, with FIG. 3A showing arrangement of each pixel, and FIG. 3B being a circuit diagram.

FIG. 4A and FIG. 4B are timing charts showing exposure and readout of an image sensor, in the first embodiment of the present invention, with FIG. 4A being at the time of reading out all pixels, and FIG. 4B being at the time of reading out for HD.

FIG. 6A to 6D show pixel color filter arrangements for an image sensor of a digital single lens reflex camera of a second embodiment of the present invention, with FIG. 6A showing structure of the color filter and a structure for connection to an FD, FIG. 6B showing connection to an FD for G, FIG. 6C showing a relationship between barycentric positions of each G pixel connected to the FD and barycentric positions of R and B pixels, and FIG. 6D showing another example of FIG. 6C.

FIG. 7A and FIG. 7B show a color filter arrangement for pixels of an image sensor of the related art, with FIG. 7A showing a color filter arrangement and FIG. 7B showing positions of pixels after addition.

DETAILED DESCRIPTION OF THE PREFERRED EMBODIMENTS

In the following, preferred embodiments using an imaging device adopting the present invention will be described using the drawings. An imaging device of a first embodiment of the present invention is a digital single lens reflex camera, and this digital single lens reflex camera displays a subject image, that is image data of a subject image acquired by a CMOS image sensor, as a moving image on a display device, and is capable of storing still image data and HD movies in a storage medium in response to operation of a release button.

Figure 1:
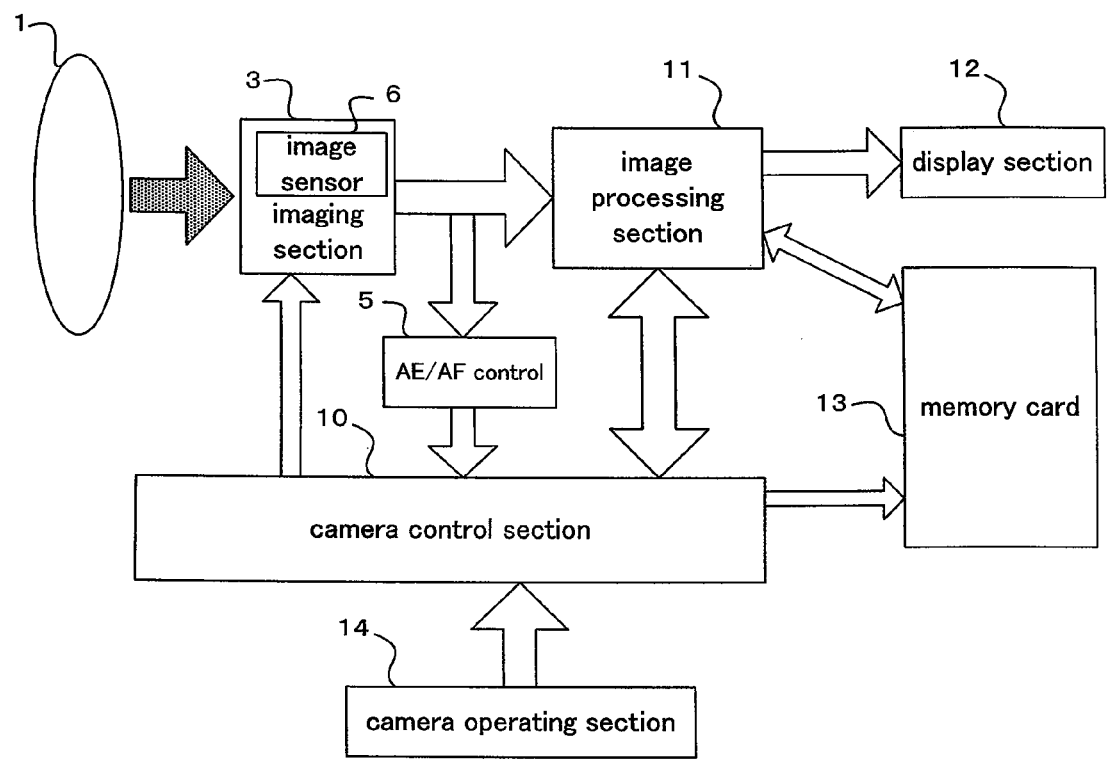
FIG. 1 is a circuit block diagram showing electrical systems of a digital single lens reflex camera relating to a first embodiment of the present invention.

FIG. 1 is a block diagram showing the electrical configuration of the digital single lens reflex camera of the first embodiment. A photographing lens 1 is an optical system for imaging a subject, and a subject image is formed on an image sensor 6 inside an imaging section 3 by this photographing lens 1. The image sensor 6 is a CMOS image sensor, and is an X-Y address scanning image sensor capable of performing reading out of accumulated electrical charge by specifying an X-Y address. Detailed structure of the image sensor 6 will be described later using FIG. 2 and FIG. 3.

Output terminals of the imaging section 3 are connected to an image processing section 11. The image processing section 11 carries out various image processing such as γ correction, white balance and color correction on read out image signals, and also performs live view processing in order to perform live view display on the display section 12, compression processing in order to store image data in a memory card 13, and expansion processing in order to display image data that has been read from the memory card 13 on the display section 12.

The display section 12 connected to the image processing section 11 is arranged on a rear surface of a camera body or the like, and as well as carrying out a playback operation for live view display and display of image data of still images and movies stored in the memory card 13, carries out information display such as exposure mode of the digital single lens reflex camera, and display of menu screens etc. The memory card 13 is formed of an electrically rewritable non-volatile memory, and performs storage of image data such as still images and HD movies formed in response to operation of a release button, which is one part of a camera operating section 14.

Also, the output terminals of the imaging section 3 are connected to an AE/AF control section 5. This AE/AF control section 5 measures brightness of a subject based on image signals output from the imaging section 3. Also, the AE/AF control section 5 extracts a high frequency component of the image signals, and performs focusing by carrying out adjustment of the photographing lens 1 so that the high frequency component becomes maximum. The camera operating section 14 has operation members operated by the photographer, such as a release button, exposure mode dial etc.

A camera control section 10 is constructed using an ASIC or the like, including an MPU (Micro Processing Unit), and together with being connected to and supplied with input of information from the imaging section 3, AE/AF control unit 5, image processing section 11, memory card 13 and camera operating section 14, performs control of these components. The camera control section 10 transmits control signals for image readout, such as all pixel readout or HD movie readout, to the imaging section 3, and the imaging section 3 performs control such as image signal accumulation and readout in accordance with the control signals.

Next, the image sensor 6 inside the imaging section 3 of this embodiment will be described. FIG. 2 shows pixel color filter arrangements for the image sensor 6, with FIG. 2A showing structure of the color filter and a structure for connection to an FD (Floating Diffusion), FIG. 2B showing connection to an FD for G (green pixels), FIG. 2C showing a relationship between barycentric positions of each G pixel connected to the FD and barycentric positions of R and B pixels, and FIG. 2D showing another example of FIG. 2C.

Figure 2A:
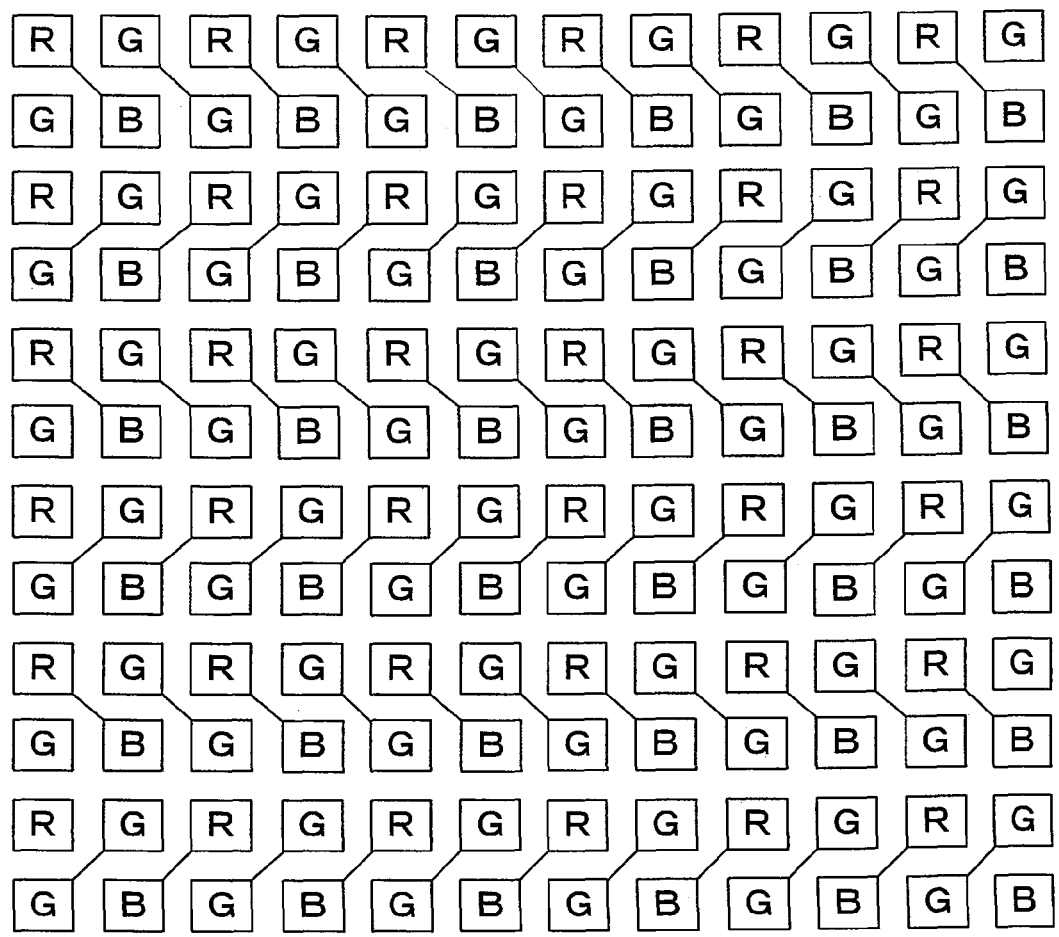
FIG. 2A to 2D show pixel color filter arrangements for an image sensor of a digital single lens reflex camera of the first embodiment of the present invention, with FIG. 2A showing structure of the color filter and a structure for connection to an FD, FIG. 2B showing connection to an FD for G, FIG. 2C showing a relationship between barycentric positions of each G pixel connected to the FD and barycentric positions of R and B pixels, and FIG. 2D showing another example of FIG. 2C.
Figure 2D:
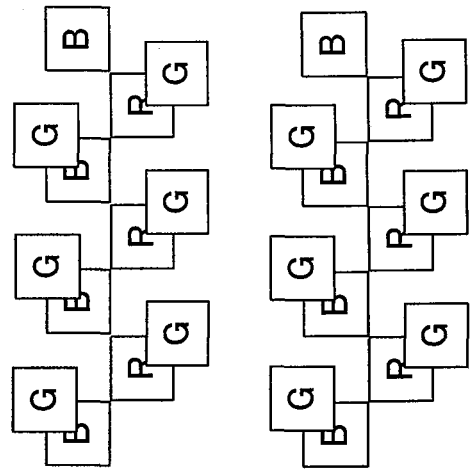
Figure 2C:
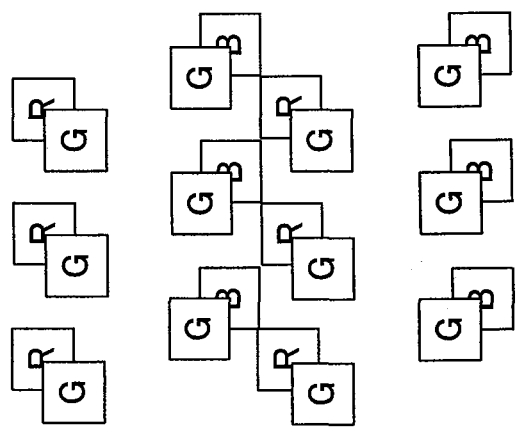

As shown in FIG. 2A, the color filter of the image sensor 6 is made up of filters of each color of RGB (respectively representing red, blue and green), in a Bayer arrangement in the X-Y directions. Also, photodiodes corresponding to each color filter, and the read circuits for these photodiodes, are made of CMOS, and it is possible to read out image signals from the photodiodes in order by X-Y scanning. In FIG. 2A, lines joining R and B, and joining G and G, represent connection lines for the FD.

Figure 2B:
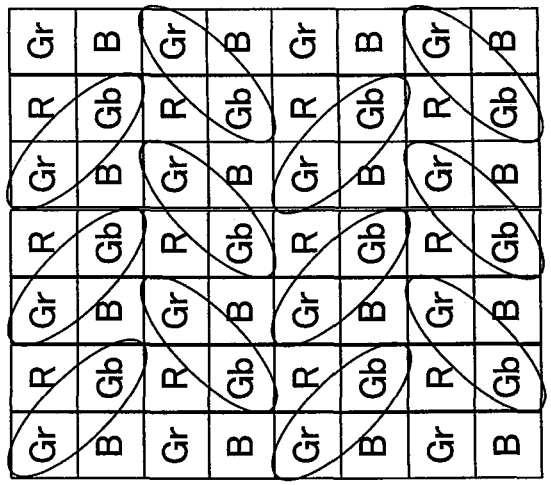

As shown in FIG. 2B, the connection lines for the FD link upper left and lower right pixels in the upper two lines (specifically they link Gr to Gb, and link R to B), and in the next two lines link upper right to lower left pixels (specifically they link Gr to Gb and link R to B). The next two lines are then connected in the same way as the upper two lines. That is, with this embodiment, a connection direction for two pixels sharing the FD is an alternately different direction for every line. In the case of connecting to the FD in this manner, due to the read timing of R and B, a pixel read out relationship is as shown in FIG. 2C and FIG. 2D.

FIG. 3A and FIG. 3B are circuit diagrams showing pixel structure of the image sensor 6, with FIG. 3A showing arrangement of each pixel, and FIG. 3B being a circuit diagram. As shown in FIG. 3A, each of the pixels for RGRG . . . are arranged on an nth line, each of the pixels for GBGB . . . are arranged on the n+1 line, pixels for each of RGRG . . . are arranged on the n+2 line, and pixels for each of GBGB are arranged on the n+3 line, and so on.

A photodiode Gr11 shown in FIG. 3B is arranged beneath a G (green) color filter, and generates electrical charge according to an amount of light received. An anode of this photodiode Gr11 is grounded, and a cathode is connected to one end of a capacitor FD11 for the FD (floating diffusion) via a transfer transistor TTr11.

The capacitor FD11 is also connected to a gate of an amplification transistor ATr11. A reset transistor RTr11 is connected across the drain and gate of the amplification transistor ATr11, and the source of the amplification transistor ATr11 is connected to a vertical output line. The gate of the previously described transfer transistor TTr11 is connected to a Gr transfer control line n, the gate of the reset transistor TTr11 is connected to a reset line n, and the drain of the amplification transistor ATr11 is connected to a voltage VDD.

A photodiode Gb21 is arranged beneath a G (green) color filter, and generates electrical charge according to an amount of light received. An anode of this photodiode Gb21 is grounded, and a cathode is connected to one end of the previously mentioned capacitor FD11 for the FD via a transfer transistor TTr21. The gate of the transfer transistor TTr21 is then connected to a Gb transfer control line n+1. The photodiode Gr11 and the photodiode Gb21 are adjacent to each other in a diagonal direction, as shown in FIG. 3A.

A photodiode R12 is arranged adjacently on the same line n as the photodiode Gr11. A photodiode B22 is also arranged diagonally adjacent to this photodiode R12. These photodiodes R12 and B22 are connected to the FD capacitor FD12, the amplification transistor ATr12 and the reset transistor RTr12, in the same relationship as the photodiode Gr11 and the photodiode Gb21.

Reset transistors RTr11, RTr12, RTr13, RTr14 . . . are connected to the reset line n, transfer transistors TTr11, TTR13 . . . are connected to the Gr transfer control line n, Transfer transistors R12, R14 . . . are connected to the R transfer control line n, transfer transistors TTr21, TTr23 . . . are connected to the Gb transfer control line n+1, and transfer transistors TTr22, TTr24 . . . are connected to the B transfer control line N+1.

Similarly, photodiodes R31, Gr32, R33 and Gr34 are connected to the n+2 line, and photodiodes B41, Gb42, B43 and Gb 44 are connected to the n+3 line. Also, FD capacitors FD31, FD32, FD33 and FD34, reset transistors RTr31, RTr32, RTr33 and RTr34, and amplification transistors ATr31, ATr32, ATr33 and ATr34 are connected to these photodiodes. A connection relationship for these elements is the same as for the n line and the n+1 line.

Next, operation of this embodiment, constructed as described above, will be described. First, a case where all pixels are read, used in cases such as still picture recording, will be described using FIG. 4A. In this case, pixel addition is not performed, and signals of all pixels are read out for every line. First, at time t1, at the same time as an H level is applied to the reset line n, H level is applied to the Gr transfer control line n and the R transfer control line n, to perform reset of the electronic shutter.

If the reset line n becomes H level, the reset transistors RTr11, RTr12, RTr13, RTr 14, . . . are turned on, and a voltage VDD is charged into the FD capacitors FD11, FD12, FD13, FD14 . . . . Also, if the Gr transfer control line n and R transfer control line n become H level, the transfer transistors TTr11, TTr12, TTr13, TTr14 . . . are turned on, and a voltage VDD is applied to the cathode side of the photodiodes Gr11, R12, Gr13, R14 . . . of the n line.

If the H level applied to the reset line n, Gr transfer control line n and the R transfer control line n changes to L level, the reset transistors RTr11 etc. and the transfer transistors TTr11 etc. are turned off, and the photodiodes Gr11, R12, Gr13, R14 . . . of the n line start to accumulate charge according to received light amount.

Then, if time t2 is reached, at the same time as an H level is applied to the reset line n, H level is also applied to the Gb transfer control line n+1 and the B transfer control line n+1, to perform reset of the electronic shutter. As a result of this, the reset transistors RTr11 etc. are turned on, and the FD capacitor FD11 etc. is charged to voltage VDD. Also, as a result of the Gb transfer control line n+1 and the B transfer control line n+1 becoming H level, the transfer transistors TTr21, TTr22, TTr23, TTr24 . . . are turned on, and a voltage VDD is applied to the cathode side of the photodiodes Gb21, B22, Gb23, B24 . . . of the n+1 line.

If the H level applied to the reset line n, Gb transfer control line n+1 and the B transfer control line n+1 changes to L level, the reset transistors RTr11 etc. and the transfer transistors TTr21 etc. are turned off, and the photodiodes Gb21, B22, Gb23, B24 . . . of the n+1 line start to accumulate charge.

Then, at time t3, at the same time as an H level is applied to the reset line n+2, H level is also applied to the Gr transfer control line n+2 and the R transfer control line n+2, to perform reset of the electronic shutter. As a result of this, the reset transistors RTr31 etc. are turned on, and the FD capacitor FD31 etc. is charged to voltage VDD. Also, as a result of the Gr transfer control line n+2 and the R transfer control line n+2 becoming H level, the transfer transistors TTr31, TTr32, TTr33, TTr34 . . . are turned on, and a voltage VDD is applied to the cathode side of the photodiodes R31, Gr32, R33, Gr24 . . . of the n+2 line.

If the H level applied to the reset line n+2, Gr transfer control line n+2 and the R transfer control line n+2 changes to L level, the reset transistors RTr31 etc. and the transfer transistors TTr31 etc. are turned off, and the photodiodes R31, Gr32, R33, Gr34 . . . of the n+2 line start to accumulate charge.

Then, at time t4, at the same time as an H level is applied to the reset line n+2, H level is also applied to the Gb transfer control line n+3 and the B transfer control line n+3, to perform reset of the electronic shutter. As a result of this, the reset transistors RTr31 etc. are turned on, and the FD capacitor FD31 etc. is charged to voltage VDD. Also, as a result of the Gb transfer control line n+3 and the B transfer control line n+3 becoming H level, the transfer transistors TTr41, TTr42, TTr43, TTr44 . . . are turned on, and a voltage VDD is applied to the cathode side of the photodiodes B41, Gb42, B43, Gb44 . . . of the n+3 line.

If the H level applied to the reset line n+2, Gb transfer control line n+3 and the B transfer control line n+3 changes to L level, the reset transistors RTr31 etc. and the transfer transistors TTr41 etc. are turned off, and the photodiodes B41, Gb42, B43, Gb44 . . . of the n+3 line start to accumulate charge.

In this way, the photodiodes Gr11, R12, Gr13, R14 . . . arranged on line n start to accumulated charge at time t1, and if time t2 is reached the photodiodes Gb21, B22, Gb23, B24 arranged on line n+1 start to accumulated charge. Then, if time t3 is reached, the photodiodes R31, Gr32, R33, Gr34 . . . arranged on line n+2 start to accumulated charge, and if time t4 is reached the photodiodes B41, Gb42, B43, Gb44 arranged on line n+3 start to accumulated charge. After that rows of photodiodes on adjacent lines start to accumulate charge.

Next, if time t5 is reached, a read out operation for pixel signals of the photodiodes Gr11 etc. arranged on the n line should commence, and H level is applied to the reset line n. As a result of this, the reset transistors RTr11 etc. are turned on, and the FD capacitor FD11 etc. is charged to voltage VDD. The capacitor is charged to voltage VDD by the previous reset, but after that there may be cases where the voltage of the FD capacitors FD11 etc. are lowered due to discharge, and so when reading out pixel signals the charge voltage of the FD capacitors FD11 etc. is initialized.

After the reset transistors RTr11 etc. have been turned off, if time t6 is reached H level is applied to the Gr transfer control line n and the R transfer control line n. As a result, the transfer transistors TTr11, TTr12, TTr13, TTr14 . . . are turned on, and a voltage of the FD capacitors FD11, FD12, FD13, FD14 . . . varies according to the photoelectrically converted charge of the photodiodes Gr11, R12, Gr13, R14 . . . . Specifically, voltage of the cathode of the photodiode Gr11 varies according to received light amount, and if the transfer transistors TTr11 etc. are turned on the FD capacitor FD11 changes to a voltage according to the cathode voltage of the photodiode Gr11 etc.

The voltage of the FD capacitors FD11 etc. is amplified by the amplifying transistors ATr11 etc. and output to the vertical output lines. Although not explicit in FIG. 3B, a control transistor for row selection is connected between a source of the amplification transistor ATr11 and each vertical line, and this transistor is turned on in synchronization with the transfer timing, to output to the vertical output line.

Next, if time t7 is reached after completion of a readout operation for pixel signals of the n line, a read out operation for pixel signals of the photodiodes Gb21 etc. arranged on the n+1 line should commence, and H level is applied to the reset line n. As a result of this, the reset transistors RTr11 etc. are turned on, and the FD capacitor FD11 etc. is charged to voltage VDD and initialized.

After the reset transistors RTr11 etc. have been turned off, if time t8 is reached H level is applied to the Gb transfer control line n+1 and the B transfer control line n+1. As a result, the transfer transistors TTr21, TTr22, TTr23, TTr24 . . . are turned on, and a voltage of the FD capacitors FD11, FD12, FD13, FD14 . . . varies according to the photoelectrically converted charge of the photodiodes Gb21, B22, Gb23, B24 . . . . The voltage of the FD capacitors FD11 etc. is amplified by the amplification transistors ATr11 etc. and output to the vertical output lines.

In this manner, the FD capacitor FD11 etc. serves as both an FD capacitor used at the time of reading out the photodiodes Gr11, R12, Gr13, R14 . . . arranged on line n, and an FD capacitor used at the time of reading out the photodiodes Gb21, B22, Gb23, B24 . . . arranged on line n+1.

Next, if time t9 is reached, a read out operation for pixel signals of the photodiodes R31, Gr32, R33, Gr34 . . . etc. arranged on the n+2 line should commence, and H level is applied to the reset line n+2. After the reset line n+2 has been made L level, if time t10 is reached H level is applied to the Gr transfer control line n+2 and the R transfer control line n+2. As a result, voltage of FD capacitor FD31 etc. varies according to photoelectrically converted voltage of the photodiode R31 etc., this voltage is amplified by the amplification transistor ATr31 etc. and output to each of the vertical output lines.

If time t11 is reached, a read out operation for pixel signals of the photodiodes B41, Gb42, B43, Gb44 . . . etc. arranged on the n+3 line should commence, and H level is applied to the reset line n+2. After the reset line n+2 has been made L level, if time t12 is reached H level is applied to the Gb transfer control line n+3 and the B transfer control line n+3. As a result, voltage of FD capacitor FD31 etc. varies according to photoelectrically converted voltage of the photodiode B41 etc., and this voltage is amplified by the amplification transistor ATr31 etc. and output to each of the vertical output lines.

In this manner, the FD capacitor FD31 etc. serves as both an FD capacitor used at the time of reading out the photodiodes R31, Gr32, R33, Gr34 . . . arranged on line n+2, and an FD capacitor used at the time of reading out the photodiodes B41, Gb42, B43, Gb44 . . . arranged on line n+3.

With this embodiment, at time t6 reading out of pixel signals is carried out together with completion of charge accumulation of the photodiodes Gr11, R12, Gr13, R14 . . . arranged on line n, and at time t8 read out of pixel signals is carried out together with completion of charge accumulation for the photodiodes Gb21, B22, Gb23, B24 . . . arranged on line n+1. Then, at time t10 reading out of pixel signals is carried out together with completion of charge accumulation of the photodiodes R31, Gr32, R33, Gr34 . . . arranged on line +2n, and at time t12 read out of pixel signals is carried out together with completion of charge accumulation for the photodiodes B41, Gb42, B43, Gb44 . . . arranged on line n+3. Thereafter, reading out of pixel signals is sequentially carried out together with completion of charge accumulation for photodiode rows of adjacent lines.

Next, a case of HD readout, used in cases such as HD movie recording, will be described using FIG. 4B. In this case, reading out of pixel signals is carried out two lines at a time, and at that time addition of two pixels is carried out for G pixels, and for R pixels and B pixels reading out is performed with one of them thinned. First, at time t21, at the same time as an H level is applied to the reset line n, H level is applied to the Gr transfer control line n, the R transfer control line n, the Gb transfer control line n+1, and the B transfer control line n+1, to perform reset of the electronic shutter.

If the reset line n becomes H level, the reset transistors RTr11, RTr12, RTr13, RTr 14, . . . are turned on, and a voltage VDD is charged into the FD capacitors FD11, FD12, FD13, FD14 . . . . Also, if the Gr transfer control line n, R transfer control line n, Gb transfer control line n+1 and the B transfer control line n+1 become H level, the transfer transistors TTr11, TTr12, TTr13, TTr14 . . . , and TTr21, TTr22, TTr23, TTr24 . . . are turned on, and a voltage VDD is applied to the cathode side of the photodiodes Gr11, R12, Gr13, R14 . . . of the n line, and the photodiodes Gb21, B22, Gb23, B24 . . . of the n+1 line.

If the H level applied to the reset line n, Gr transfer control line n, R transfer control line n, Gb transfer control line n+1 and the B transfer control line n+1 changes to L level, the reset transistor RTr11 etc. and the transfer transistors TTr11 etc. and TTr21 etc. are turned off, and the photodiodes Gr11, R12, Gr13, R14 . . . of the n line, and the photodiodes Gb21, B22, Gb23, B24 . . . of the n+1 line, start to accumulate charge.

Next, if time t22 is reached, at the same time as an H level is applied to the reset line n+2, H level is also applied to the Gr transfer control line n+2, the R transfer control line n+2, the Gb transfer control line n+3, and the B transfer control line n+3, to perform reset of the electronic shutter.

If the reset line n+2 becomes H level, the reset transistors RTr31, RTr32, RTr33, RTr34, . . . are turned on, and a voltage VDD is charged into the FD capacitors FD31, FD32, FD33, FD34 . . . . Also, if the Gr transfer control line n+2, R transfer control line n+2, Gb transfer control line n+3 and the B transfer control line n+3 become H level, the transfer transistors TTr31, TTr32, TTr33, TTr34 . . . , and TTr41, TTr42, TTr43, TTr44 . . . are turned on, and a voltage VDD is applied to the cathode side of the photodiodes R31, Gr32, R33, Gr34 . . . of the n+2 line, and the photodiodes B41, Gb42, B43, Gb44 . . . of the n+3 line.

If the H level applied to the reset line n+2, Gr transfer control line n+2, R transfer control line n+2, Gb transfer control line n+3 and the B transfer control line n+3 changes to L level, the reset transistor RTr31 etc. and the transfer transistors TTr31 etc. and TTr41 etc. are turned off, and the photodiodes R31, Gr32, R33, Gr34 . . . of the n+2 line, and the photodiodes B41, Gb42, B43, Gb44 . . . of the n+3 line start to accumulate charge.

Next, if time t23 is reached, a read out operation for pixel signals of the photodiodes Gr11 etc. arranged on the n line, and photodiodes Gb21 etc. arranged on the n+1 line, should commence, and H level is applied to the reset line n. As a result of this, the reset transistors RTr11 etc. are turned on, and the FD capacitor FD11 etc. is charged to voltage VDD.

After the reset transistors RTr11 etc. have been turned off, if time t24 is reached H level is applied to the Gr transfer control line n, the R transfer control line n, and the Gb transfer control line n+1. As a result, the transfer transistors TTr11, TTr12, TTr13, TTr14 . . . , and TTr21, TTr23 . . . are turned on, and voltage of the FD capacitors FD11, FD12, FD13, FD14 . . . varies according to the photoelectrically converted charge of the photodiodes Gr11, R12, Gr13, R14 . . . , Gb21, Gb23 . . . .

Specifically, photoelectrically converted charge of the photodiode Gr11 and the photodiode Gb21, corresponding to a Gr pixel and a Gb pixel, is added by the FD capacitor FD11. A photodiode R12 corresponding to an R pixel and a photodiode B22 corresponding to a B pixel are connected to the FD capacitor FD12. At the time t24, the R transfer control line n becomes H level, while the B transfer control line n+1 remains at an L level, and so only photoelectrically converted charge of the photodiode R12 is transferred to the FD capacitor FD11, and this voltage is amplified by the amplification transistor ATr12 and output to a vertical output line.

In this way, at time t24, two G pixels signals for the n line and the n+1 line are amplified and output to the vertical output line, while of the R pixel signal and the B pixel signal, the B pixel signal is thinned and the R pixel signal is output.

Next, if time t25 is reached, a read out operation for pixel signals of the photodiodes Gr32 etc. arranged on the n+2 line, and photodiodes B41 etc. arranged on the n+3 line, should commence, and H level is applied to the reset line n+2. As a result of this, the reset transistors RTr31 etc. are turned on, and the FD capacitor FD31 etc. is charged to voltage VDD.

After the reset transistors RTr31 etc. have been turned off, if time t26 is reached H level is applied to the Gr transfer control line n+2, the Gb transfer control line n+3, and the B transfer control line n+3. As a result, the transfer transistors TTr32, TTr33, TTr34 . . . , and TTr41, TTr 42, TTr43, TTr44 . . . are turned on, and voltage of the FD capacitors FD31, FD32, FD33, FD34 . . . varies according to the photoelectrically converted charge of the photodiodes Gr32, Gr34 . . . , B41, Gb42, B43, Gb44 . . . .

Specifically, photoelectrically converted charge of the photodiode Gr32 and the photodiode Gb42, corresponding to a Gr pixel and a Gb pixel, is added by the FD capacitor FD32. A photodiode R31 corresponding to an R pixel and a photodiode B41 corresponding to a B pixel are connected to the FD capacitor FD31. At the time t26, the B transfer control line n+3 becomes H level, while the R transfer control line n+2 remains at an L level, and so only photoelectrically converted charge of the photodiode B41 is transferred to the FD capacitor FD31, and this voltage is amplified by the amplification transistor ATr31 and output to a vertical output line.

In this way, at time t26, two G pixel signals for the n+2 line and the n+3 line are added, and output to the vertical output line. On the other hand, of the R pixel signal and the B pixel signal, the R pixel signal is thinned and the B pixel signal is output.

After that, sequentially, two G pixel signals are added and output to the vertical output line, and R pixel signal and B pixel signals are alternately thinned and output to the vertical signal line. If read out for each line is completed, then in order to perform imaging for the image of the next frame, similarly to at time t21 and t22, the reset control lines and transfer lines are set to H level, that is, reset of the electronic shutter is performed, and the previous operations are repeated.

Figure 5:
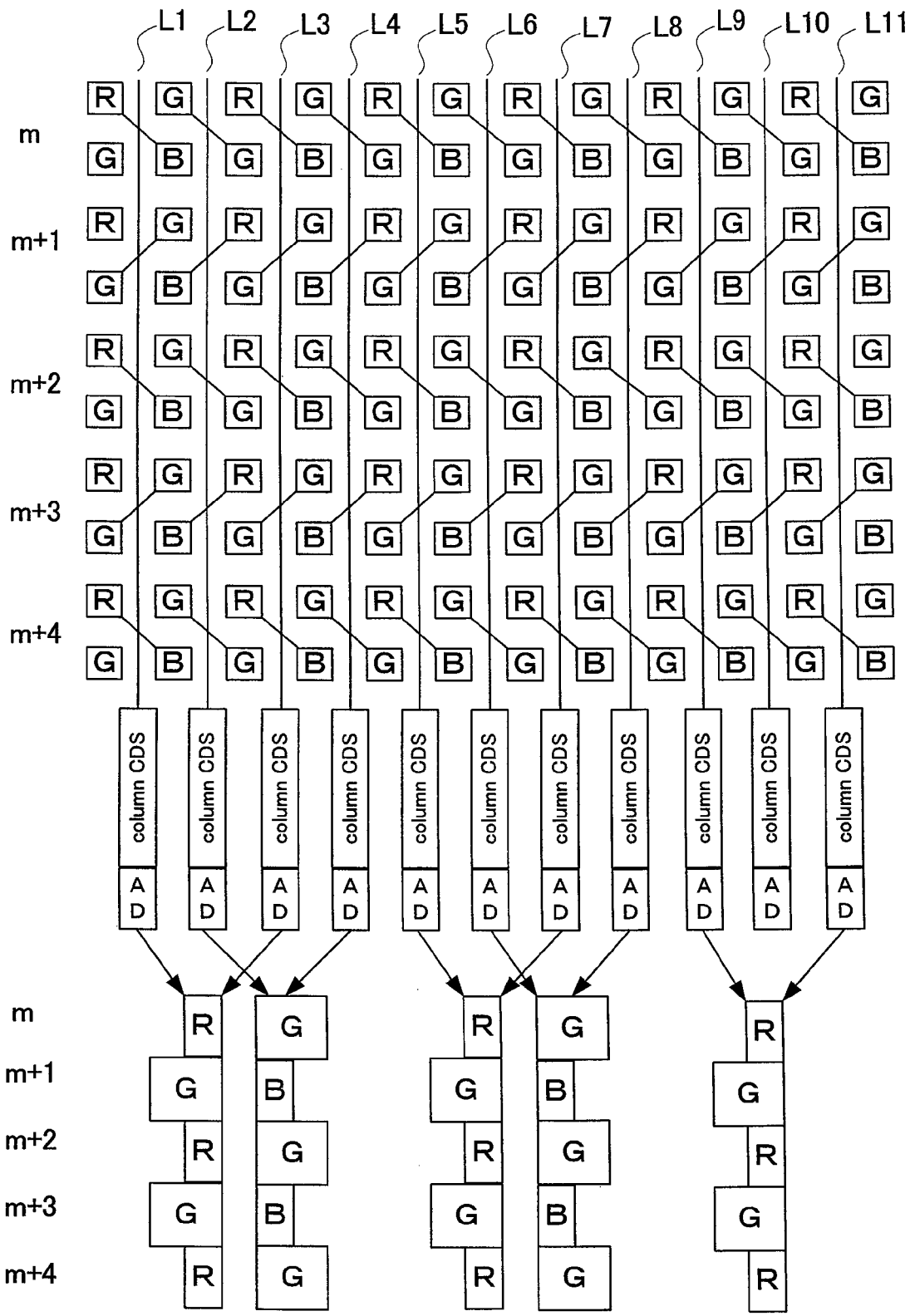
FIG. 5 is a drawing showing an aspect of horizontal two pixel addition at the time of HD readout, in the first embodiment of the present invention.

Next, the operations of adding the two G pixel signals and thinning the R or B pixel signals will be described using FIG. 5. In the drawing, the m line corresponds to the n line and n+1 line of FIG. 3 and FIG. 4, while the m+1 line corresponds to the n+2 line and n+3 line.

At the time of reading out the m line, an R pixel signal is output to the vertical output line L1, a G pixel signal for two G pixels is output to the vertical output line L2, an R pixel signal is output to the vertical output line L3, and a G pixel signal for two G pixels is output to the vertical output line L4. Pixel signals that have been output to these vertical output lines L1-L4 are input to a column CDS as a horizontal adding section, and addition processing for horizontal scanning is performed by this column CDS. Output of the column CDS is then converted to a digital signal by an AD (analog to digital) converter. As shown in FIG. 5, at the time of reading out the m line, a G pixel signal for 4 pixels and an R signal for 2 pixels are read out.

At the time of reading out the m+1 line, a G pixel signal for two pixels is output to the vertical output line L1, a B pixel signal is output to the vertical output line L2, a G pixel signal for two pixels is output to the vertical output line L3, and a B pixel signal is output to the vertical output line L4. Pixel signals output to these vertical output lines L1-L4 are added by a column CDS, and after that converted to a digital signal by an AD (analog to digital) converter and output from the image sensor 6. At the time of reading out the m+1 line, a G pixel signal for 4 pixels and a B signal for 2 pixels are read out.

At the time of reading out the m+2 line, similarly to when reading out the m line, a G pixel signal for 4 pixels and an R signal for 2 pixels are read out. Also, at the time of reading out the m+3 line, similarly to reading out the m+1 line, a G pixel signal for four pixels and a B pixel signal for two pixels are read out, and at the time of reading out the m+4 line, similarly to reading out the m line, a G pixel signal for four pixels and a R pixel signal for two pixels are read out. In this manner a G pixel signal for 4 pixels, and either a B signal for 2 pixels or an R signal for two pixels, are alternately read out.

As has been described above, with the first embodiment of the present invention, in the case of high speed movie recording, such as HD movie, output is achieved by alternately thinning an R pixel signal and a G pixel signal, and adding pixel signals for the G pixel signals. Therefore, it is possible to give a pixel number appropriate for HD movie, and for a G pixel signal, that influences the brightness signal, adding is performed, which means that it is possible to obtain a HD movie etc. with a good S/N ratio.

Also, with this embodiment a combination direction for carrying out addition of pixels of the n line and n+1 line, and a combination direction for carrying out addition of pixel signals of the n+2 line and the n+3 line, are different from each other. Specifically, two pixels sharing an FD capacitor are adjacent in different directions for each row. At the time of addition and read out, therefore, a pixel arrangement of a Bayer type is possible for G, which is advantageous from the viewpoint of resolution. Also, since the direction is different for each row, there is the effect that there is no occurrence of directional difference in diagonal resolution.

Next, a second embodiment of the present invention will be described. As shown in FIG. 2, each of the pixels of RGB in the first embodiment are arranged so that two pixels sharing an FD capacitor are adjacent in different direction in each row. As shown in FIG. 6A-6D, each of the pixels of RGB in the second embodiment are arranged so that two pixels sharing an FD capacitor are adjacent in the same direction even if the row is different.

Figure 6A:
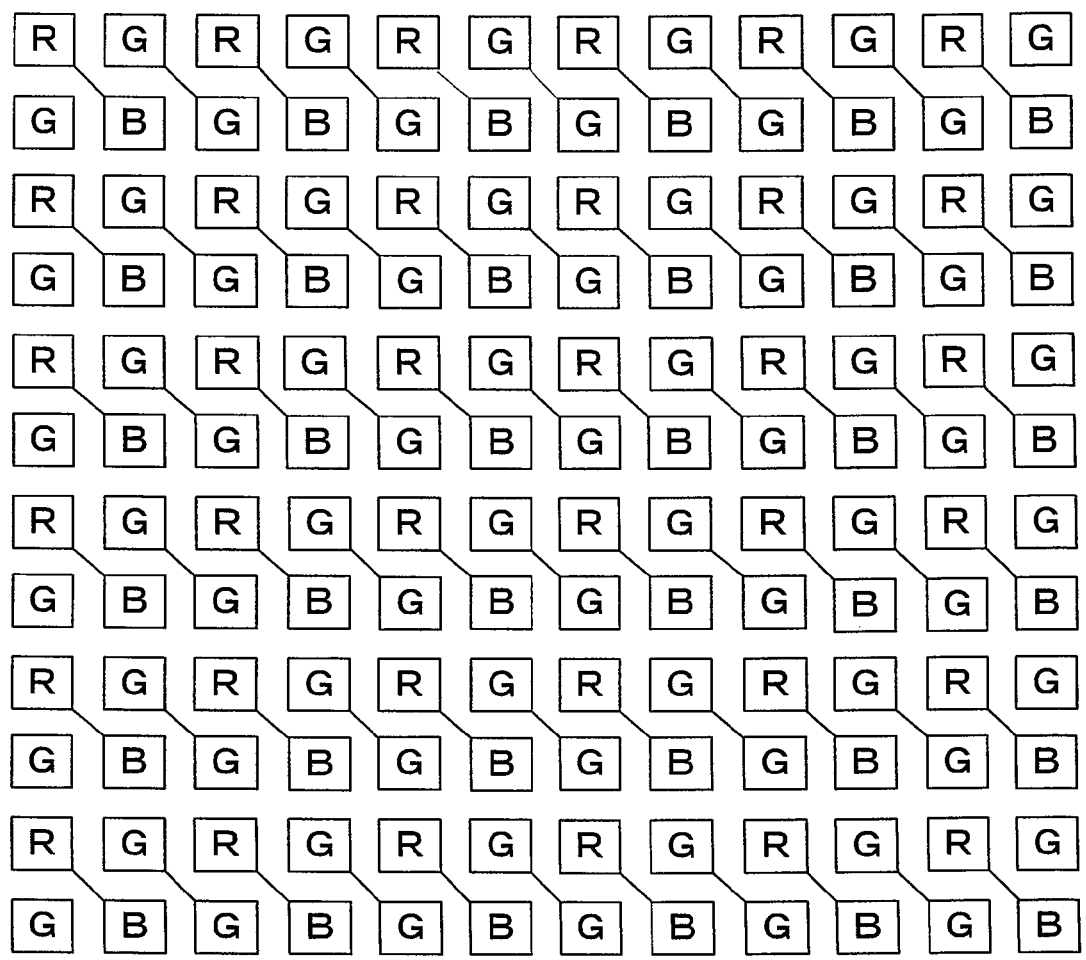

FIG. 6A shows the structure of a color filter and a structure for connection to an FD (Floating Diffusion), FIG. 6B showing connection for FD of G (green pixels), FIG. 6C showing a relationship between barycentric positions of each G pixel connected to the FD and barycentric positions of R and B pixels, and FIG. 6D showing another example of FIG. 6C. A color filter arrangement for an image sensor 5 is made a Bayer array in the X-Y directions, similar to FIG. 2. Similar to FIG. 3, photodiodes corresponding to each color filter, and the read circuits for these diodes, are arranged in a CMOS structure, and it is possible to sequentially readout image signals from the photodiodes by X-Y scanning.

In FIG. 6A, a straight line linking R and B, or G and G, represents a connecting line for FD, and as previously described the direction of that connection is the same even if the row is different. The second embodiment is the same as the first embodiment apart from this directionality of connection lines for the FD, and so detailed description will be omitted.

As has been described above, in each of the embodiments of the present invention it is possible to perform pixel addition and output in small size and with a simple structure, so as to perform respectively independent transfer control in order to carry out high speed readout applicable to HD movies etc.

The configuration of the transfer transistors, reset transistors and amplification transistors of each of the embodiments of the present invention is not limited to that shown in the embodiments, and can be suitable modified as long as the result is a circuit structure that can perform charge accumulation and readout. Also, in each embodiment, a rolling reset is carried out when taking a still picture, but in the case of exposure control for a still image using a mechanical shutter, it is possible to carry out a batch reset.

Also, each of the embodiments of the present invention has been described using a digital single lens reflex camera, but there is no problem with applying the present invention to a compact camera, or besides a digital camera, to an imaging device incorporated into a mobile telephone or mobile information terminal (PDA: Personal Digital Assistant).

Description has been given above of the embodiments of the present invention, but the present invention is not limited to these embodiments, and structural elements may be modified in actual implementation within the scope of the gist of the embodiments. It is also possible form various inventions by suitably combining the plurality structural elements disclosed in each of the above described embodiments. For example, it is possible to omit some of the structural elements shown in each of the embodiments. It is also possible to suitably combine structural elements from different embodiments.

What is claimed is:

1. A drive unit for an X-Y scanning type image sensor having an RGB Bayer array color filter, comprising:
   for horizontal scanning, a drive section performing addition and readout of a first FD (floating diffusion) shared by two pixels of the same color that are adjacent in a diagonal direction by simultaneously transferring electrical charge of the two pixels of the same color, and for a second FD shared by two pixels of different colors that are adjacent in a diagonal direction, transferring and reading out electrical charge of a pixel of one color among the two pixels of different colors; and
   a horizontal adding section for adding electrical charges that are adjacent in a horizontal direction, among electrical charges for two pixels of the same color that have been added in the horizontal scanning and read out, and adding electrical charges that are adjacent in the horizontal direction among electrical charges of associated pixels of the same color, of the two pixels of different color that have been read out in the horizontal scanning, and reading out.

2. The drive unit for an image sensor of claim 1, wherein:
   the read out electrical charge is used in a HD (High Definition) movie signal.

3. A drive method for an X-Y scanning type image sensor having an RGB Bayer array color filter, comprising:
   for horizontal scanning, performing addition and readout of a first FD (floating diffusion) shared by two pixels of the same color that are adjacent in a diagonal direction by simultaneously transferring electrical charge of the two pixels of the same color, and for a second FD shared by two pixels of different colors that are adjacent in a diagonal direction, transferring and reading out electrical charge of a pixel of one color among the two pixels of different colors; and
   for adding electrical charges that are adjacent in a horizontal direction, among electrical charges for two pixels of the same color that have been added in the horizontal scanning and read out, adding electrical charges that are adjacent in the horizontal direction among electrical charges of associated pixels of the same color, of the two pixels of different color that have been read out in the horizontal scanning, and reading out.

4. An imaging device for an X-Y scanning type image sensor having an RGB Bayer array color filter, comprising:
   for horizontal scanning, a drive section performing addition and readout of a first FD (floating diffusion) shared by two pixels of the same color that are adjacent in a diagonal direction by simultaneously transferring electrical charge of the two pixels of the same color, and for a second FD shared by two pixels of different colors that are adjacent in a diagonal direction, transferring and reading out electrical charge of a pixel of one color among the two pixels of different colors;
   a horizontal adding section for adding electrical charges that are adjacent in a horizontal direction, among electrical charges for two pixels of the same color that have been added in the horizontal scanning and read out, and adding electrical charges that are adjacent in the horizontal direction among electrical charges of associated pixels of the same color, of the two pixels of different color that have been read out in the horizontal scanning, and reading out;
   an image processing section for processing signals that have been read out by the control horizontal adding section; and
   a storage section for storing image data that has been processed by the image processing section.

5. The imaging device of claim 4, wherein:
   two pixels that are adjacent in the diagonal direction are adjacent in different directions in each row.

6. An X-Y scanning type image sensor having an RGB Bayer array color filter, comprising:
   a first FD (Floating Diffusion) common to two G pixels, the two G pixels being adjacent to each other in a diagonal direction and being connected to the first FD by means of a first transfer transistor and a second transfer transistor, respectively;
   a first reset transistor connected to the first FD; a first amplification transistor connected to the first FD;
   a second FD, common to two pixels of R and B, that are adjacent to each other in a diagonal direction, and are connected to the second FD by means of a third transfer transistor and a fourth transfer transistor, respectively;
   a second reset transistor connected to the second FD;
   a second amplification transistor connected to the second FD; and
   a signal reading section connected to the first amplification transistor and the second amplification transistor, and wherein the first transfer transistor, the second transfer transistor, the third transfer transistor and the fourth transfer transistor are respectively independently connected to transfer control lines for carrying out transfer control.

7. The image sensor of claim 6, wherein:
   the two pixels that share the first FD are adjacent in different directions in each row.

* * * * *